(12) United States Patent
Shen et al.

(10) Patent No.: US 9,110,954 B2
(45) Date of Patent: Aug. 18, 2015

(54) SINGLE ACCESS METHOD FOR MULTIPLE MEDIA SOURCES

(71) Applicants: Kevin Shen, Sunnyvale, CA (US); David Daney, San Jose, CA (US); Johannes P. Schmidt, Los Altos Hills, CA (US); Steven S. Francis, Saratoga, CA (US)

(72) Inventors: Kevin Shen, Sunnyvale, CA (US); David Daney, San Jose, CA (US); Johannes P. Schmidt, Los Altos Hills, CA (US); Steven S. Francis, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 69 days.

(21) Appl. No.: 13/775,315

(22) Filed: Feb. 25, 2013

(65) Prior Publication Data

US 2013/0166546 A1 Jun. 27, 2013

Related U.S. Application Data

(62) Division of application No. 10/919,837, filed on Aug. 16, 2004, now abandoned.

(60) Provisional application No. 60/495,785, filed on Aug. 15, 2003.

(51) Int. Cl.
*G06F 17/30* (2006.01)

(52) U.S. Cl.
CPC ...... *G06F 17/3053* (2013.01); *G06F 17/30029* (2013.01)

(58) Field of Classification Search
CPC .................................................. G06F 17/30132
USPC ............... 707/2, 3; 709/203; 725/39, 46, 109
See application file for complete search history.

(56) References Cited

U.S. PATENT DOCUMENTS

| | | | |
|---|---|---|---|
| 6,438,579 B1 * | 8/2002 | Hosken | 709/203 |
| 7,296,284 B1 * | 11/2007 | Price et al. | 725/39 |
| 2001/0003214 A1 * | 6/2001 | Shastri et al. | 725/109 |
| 2003/0144918 A1 * | 7/2003 | Novelli et al. | 705/26 |
| 2004/0060063 A1 * | 3/2004 | Russ et al. | 725/46 |
| 2006/0168340 A1 * | 7/2006 | Heller et al. | 709/242 |

* cited by examiner

*Primary Examiner* — Etienne Leroux
(74) *Attorney, Agent, or Firm* — Trop, Pruner & Hu, P.C.

(57) ABSTRACT

Method and systems for searching for media instances of interest to a user are described. User input specifying criteria for content is received and parameters are defined based on the user input. A plurality of databases are searched for media instances meeting the defined parameters, wherein the plurality of databases includes at least one database containing broadcast television content information and at least one database containing non-broadcast television content information. Information about the media instances meeting the defined parameters is retrieved from the plurality of databases. The retrieved information is provided to the user.

18 Claims, 3 Drawing Sheets

SINGLE ACCESS METHOD FOR MULTIPLE MEDIA SOURCES

This application is a divisional of U.S. patent application Ser. No. 10/919,837, filed on Aug. 16, 2004, which claims the benefit of U.S. Provisional Application No. 60/495,785, filed on Aug. 15, 2003, which is incorporated by reference herein.

BACKGROUND

This invention relates to searching for and acquiring media content that is of interest to a user.

The Internet, as embodied in HTML pages and other content that can be delivered in standardized web browsers, has evolved to provide a wealth of information about different topics and access to companies that deliver products and services. Internet users can identify specific content that is interesting to the user, such as media, by using Internet search engines. Media can be any creative work, including without limitation: music, movies, television shows, radio broadcasts, books, magazines, web pages, paintings, drawings and live performances (or recording thereof, in any form). Some companies provide browser-resident forms to allow Internet users to purchase or license content directly. Other companies deliver products, typically software or media content in a digital form to a requesting computer on demand or otherwise make products available to the purchaser/licenser.

Another way of providing users with access to media content and products of interest does not use a personal computer display and keyboard to access the products and content. Instead, a simplified control system finds and accesses content in the context of a media presentation system, e.g., a television, and provides a searching and previewing method that is specific to such system.

Conventional digital media server products from TiVo, Mediabolic, and others provide access to multiple media types (e.g., television programs, broadcast movies, recorded music, and digital photographs), along with the ability to search available media, then access and deliver selected media. Some of these digital media servers can search future offerings of a particular media supplier (e.g., a particular cable system operator).

SUMMARY

A system is provided that is operative to access a broad search space, including both public and proprietary databases encompassing a variety of both currently available media and media with planned future availability. Many sources are searched simultaneously so that users are provided with access to a wide variety of media. At least one of the sources can include content that is broadcast for viewing, including television programming or movie content. In addition, a list of media a user is interested in can be stored in the system and accessed to provide search parameters, allowing the system to automatically continue to search available media repositories, for example, as new information becomes available. The system can notify the user when new media, or media in a desired form, becomes available.

In one implementation, a method for searching for media of interest to a user is described. User input is received specifying criteria for content and parameters are defined based on the user input. A plurality of databases are searched for media instances meeting the defined parameters, wherein the plurality of databases includes at least one database containing broadcast television content information and at least one database containing non-broadcast television content information. Information is retrieved about the media instances meeting the defined parameters from the plurality of databases. The retrieved information is provided to the user.

In one implementation, a system capable of searching for media is described. The system includes a data communicator and a search engine. The data communicator can receive user input, wherein the user input includes criteria for content, and the data communicator can define parameters based on the user input. The search engine can search a plurality of databases for media instances meeting the determined parameters and retrieve information about the media instances meeting the defined parameters from the plurality of databases. The plurality of databases searched can include at least one database containing broadcast television content information and at least one database containing non-broadcast television content information. The system can also include a remote control for receiving user input and sending user input to the data receiver, a graphics module capable of receiving search results from the search engine and transmitting a representation of the search results to a television screen, a purchasing engine capable of purchasing media or a license for media selected by the user, a memory for storing at least a portion of the search results, a notification system for notifying a user regarding a media instance that becomes available at a time subsequent to the search and a media acquisition engine configured to acquire one or more media instances from the media instances meeting the defined parameters.

In another implementation, a method for searching for media of interest to a user is described. The method includes finding groups of reviews of media instances where each media instance is assigned a review and the media instances are grouped according to a reviewer who assigned the review to the media instance and correlating a group of reviews to the user according to the reviews in the group and information known about the user's media interests. A media instance is then selected from the correlated group that is potentially of interest to the user, wherein the selected media instance is assigned a favorable review by the reviewer.

In yet another implementation, a method for searching for media of interest to a user is described. An indication is received from the user during presentation of a media instance that the user is interested in related media instances. The related media instances are searched for and information about related media instances is retrieved. A representation of the information is presented to the user about the related media instances.

In another implementation, a method for searching for media of interest to a group of users is described. A plurality of lists of media instances that are of interest to a plurality of users in a group are received. from the lists, media instances that are of interest to all members of the group are determined. Information is displayed about the media instances that are of interest to all the members of the group.

Aspects of the invention can include none, one or more of the following advantages. The search system can combine searching for media instances and sources that previously were only accessibly by performing separate searches. The system therefore can streamline a user's search for media instances of interest. Because multiple media sources can be accessed, a single database including large stores of media related data need not be maintained. Further, multiple television schedules can be combined, such as cable, satellite and broadcast television, where previously only a single television schedule is typically accessible by a traditional television program search system. Accessing a broad search space can provide a user with a greater number of results of media instances than when searching with traditional search methods. A greater number of results can provide a user with a greater number of choices in selecting a media instance. The search system can provide the user with options for receiving a selected media instance at the time that the user desires and in a form that the user prefers.

The search system can be implemented with a television. The user can be provided with a display of the results from a search that is easy to read and user friendly. The display can increase the ease of selecting elements that are likely to be of interest to the user. The display can include indications, such as color, texture and symbols, to assist a user in knowing the attributes of the media instance. The system can continue to search for newly available media instances, occasionally or continuously performing multiple previously defined searches. This can free a user from performing duplicate searches and provide the user with new search results. The system can notify a user, or another person or other people of the user's choice, when media instances become available. The system can also find new media instances for the user that the user may be interested in by using a critical correlation method. The critical correlation method can introduce the user to new media instances that the user may not be aware of. The critical correlation method can also provide the user with media instances that the user is interested in, that have passed a quality test and are more likely to appeal to the user than instances identified by simple searches of instance metadata. The system can also provide the user with a range of services that can be applied to media instances that the user already owns.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

A media search system can provide a user with information about media that is potentially of interest to the user. A user can be anonymous and represent multiple users who are indistinguishable, but in one implementation, users are uniquely identified, and all references to a "user" are to a particular user who is differentiated from all other users. The media information can be derived from multiple sources, thereby casting a wider net and capturing a wider variety of media than with traditional search methodologies. The user can communicate with the media search system using a simple device, such as a remote with merely a few function-specific keys to input the user's requests and selections. The media search system can operate in conjunction with a common household electronic device, such as a television set. The media search system can store the user's preferences and requests, so that the search system can notify the user when desired media becomes available in a form that the user is interested in. Search requests can be stored for a later application to updated information sources to discover new instances of interest to the user.

System

Figure 1:
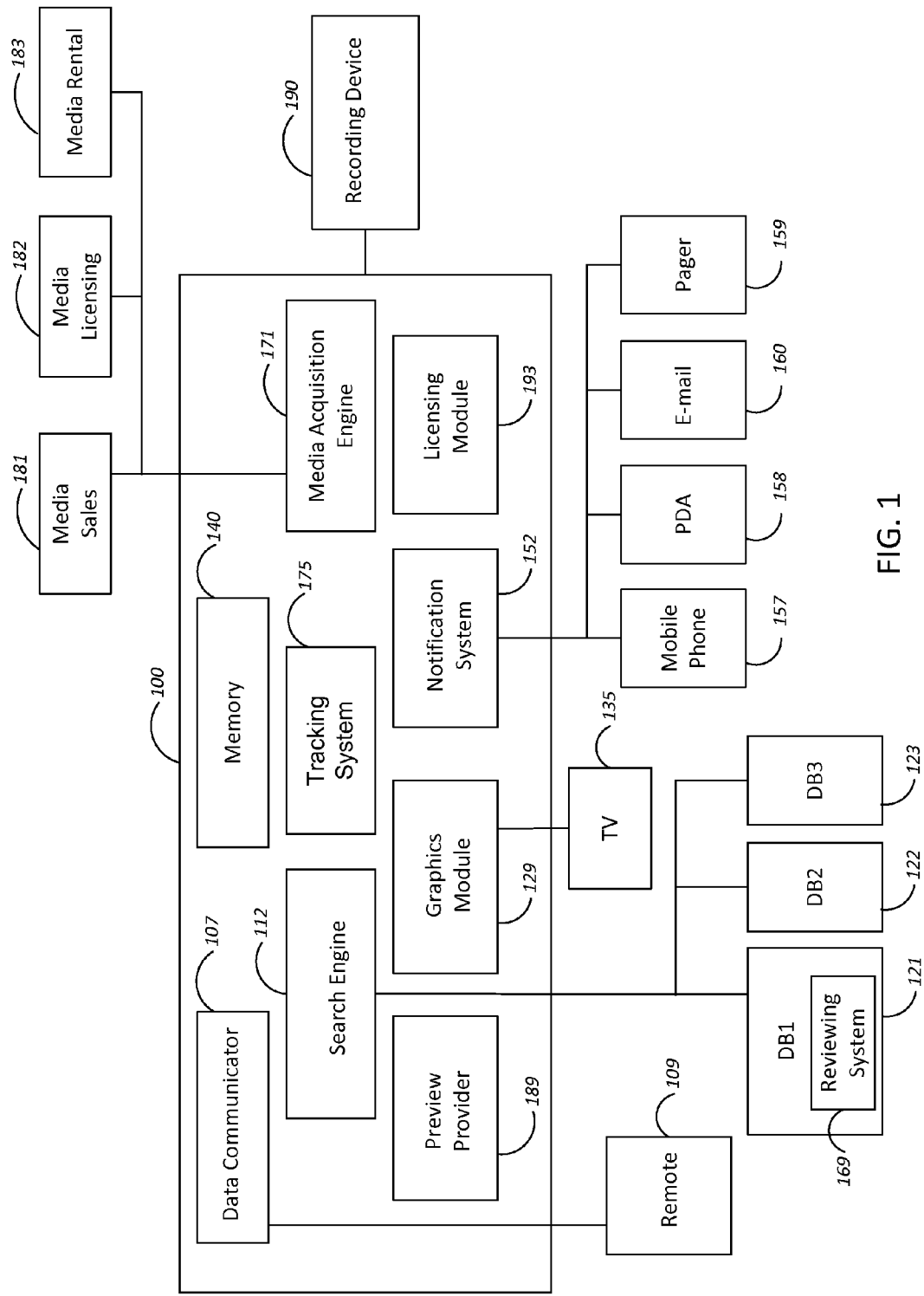
FIG. 1 is a block diagram of a media search system.

Referring to FIG. 1, a media search system 100 is provided for searching for media of interest to a user and providing the results to the user. One individual work may be referred to as a "media instance" or an "instance". The media search system 100 can include a data communicator 107. A user can send input to the data communicator 107 with an input device, such as a wired or wireless device (infrared, RF or other), such as a remote 109, including a television, personal video recorder, universal, or other suitable remote, a microphone, one or more buttons, a full keyboard, a pointing device, a mouse or a touch pad.

The data communicator 107 also communicates with a search engine 112, sending the user input to the search engine 112. The search engine 112, in turn, can query databases 121, 122, 123 and retrieve information from the databases 121, 122, 123. In particular, the search engine 112 can include hooks to databases that are media repositories. In one implementation, one of the databases 121 can include a reviewing system 169. In one implementation, one of the databases 123 can include information about the user's media collection. The search engine 112 can communicate the retrieved information to a graphics module 129. The graphics module 129 sends a representation of the retrieved information to a display, such as a television 135, computer screen or other display suitable for a user viewing.

User input and retrieved information can be stored in a memory 140. A notification system 152 can access stored information from the memory 140. The notification system 152 can send the accessed information to a device viewable by the user, such as the television 135 or a personal computer or communications device, such as a mobile telephone 157, a Personal Digital Assistant 158, a pager 159 or an electronic mail account 160. A tracking engine 175 can track media of interest for the user, after an initial search is performed.

The media search system 100 can also include a media acquisition engine 171 that is in communication with one or more media licensing or media sales groups 181, 182, 183, rental agencies and a recording device 190, such as a personal video recorder, a video cassette recorder, a digital recorder or other recording device. The recording device 190 can be internal or external to the media search system 100. The media search system 100 can also include a preview provider 189 that sends a preview of a media instance to the display. The previews sent by the preview provider 189 can include video clips, thumbnails, audio clips and other representations of a media instance. The user can repeat, skim (e.g., rewind and fast forward), skip portions, zoom or end the preview experience at any time. The memory 140 can store the previews for later access. The media search system 100 can also include a license module 193 that determines whether a valid license is required for a user to access a media instance and whether the user has the required license. The license module 193 can also obtain any required licenses.

In one implementation, the media search system 100 can include software that operates on a device or software that is accessible to the user, but that is stored on a device remote from the user. Alternatively, the media search system 100 can include software that the user can install and operate on the user's computer. The media search system 100 can also include a browser window, i.e., a bi-directional data stream that can be presented and interacted with using a commercially available software program, such as, Microsoft Internet Explorer.

A user can construct a search for media instances, such as by selecting search criteria, for sending to the media search system 100. The criteria for a media search can include a description of the desired media instances, such as general or specific categories, e.g., movies, musical recordings, episodic television shows, or art works; a form of the media instance, such as on a recording medium, including magnetic tape or optical disk, or for digital delivery, DVD, CD, broadcast, live performance or a film presented in a theater; media available from a certain sales channel, e.g., a bookstore, a video store, an electronic download, or broadcast television; dated materials within a specified range of dates; media created by a specified artist, e.g., a writer, musician, actor, or painter; titles including keywords; descriptions including keywords; depictions of specified persons, places, or events, e.g., Seinfeld episodes about soup, paintings of Plato, songs about sunglasses, or photographs of Venice; media containing, or not containing, certain elements, e.g., nudity, foul language, sports themes, or children's themes; critically acclaimed media, e.g., awards or star ratings; media of particular popular appeal, e.g., as measured by audience feedback or sales, in general or to a particular demographic. The user can send the search criteria to the media search system 100, such as by sending data with a remote control 109.

User Requested Media Search

Figure 2:
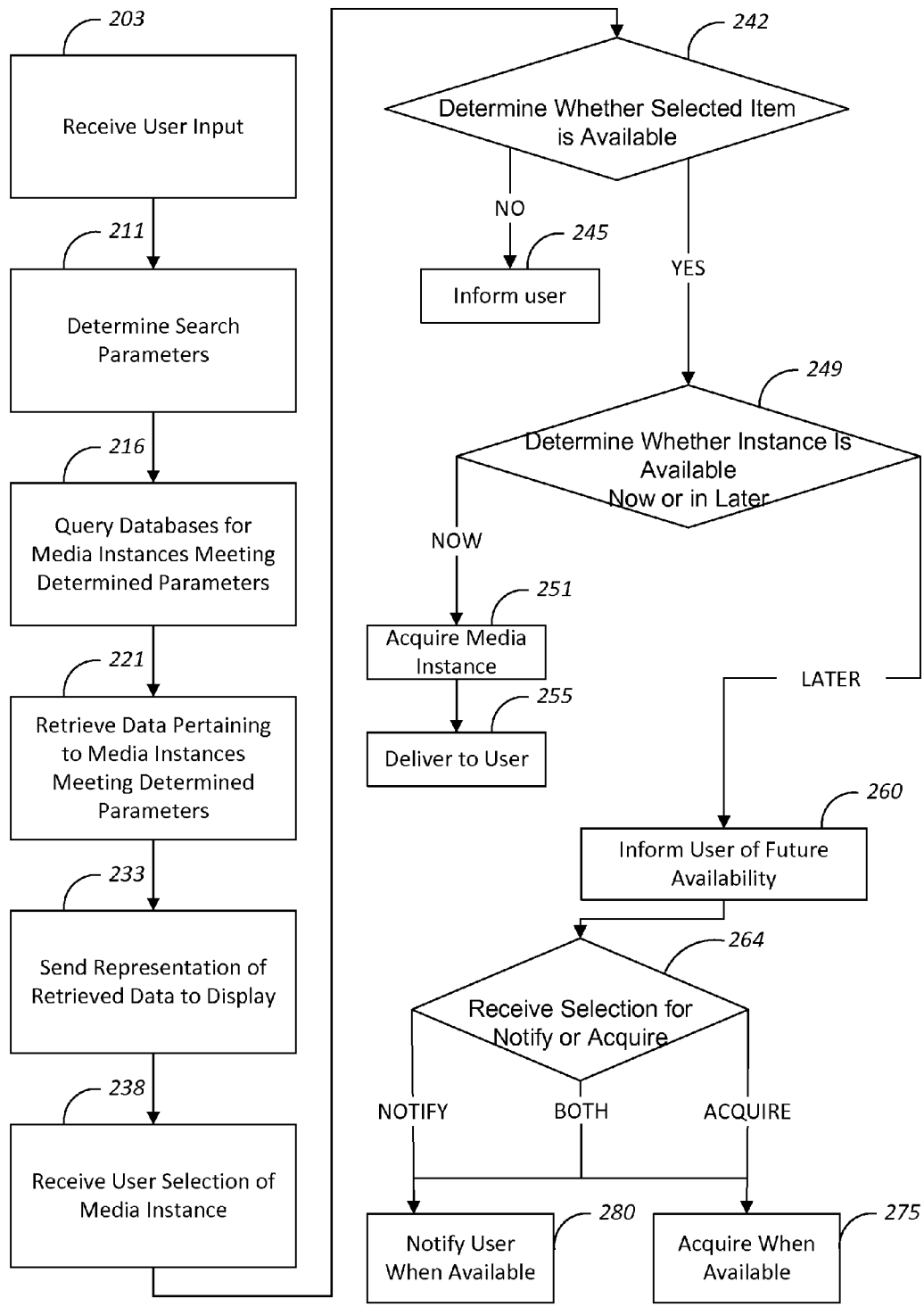
FIG. 2 is a flow diagram of a process for searching for media.

The media search system 100 such as one including one or more of the components described above, can then be used to search for media instances meeting the criteria set out by the user, as shown in FIG. 2. Referring now to FIGS. 1 and 2, the process begins with the data communicator 107 receiving user input (step 203). The data communicator 107 can send the user input to the search engine 112.

The search engine 112 then determines search parameters based on the user input (step 211). In one implementation, determining search parameters merely uses the criteria or terms in the user input. In another implementation, determining search parameters includes identifying media of particular interest to the user.

To define the search parameters, the search engine 112 can combine the user's input criteria with information the media search system 100 already knows about the user's interests. Information related to the user's media instance preferences can be stored in the memory 140. The information can be determined from the user's media consumption history. Media consumption can include watching, reading, listening, viewing, attending or any other form of user participation. Such history can be input by the user, or acquired by the memory 140 as the user engages in search, acquisition and consumption activity. In addition to the user's viewing, reading and listening activity, the history can also include the timing and duration of such activity, as well as the user's ratings of media. The user can input his or her ratings of media into the media search system 100, i.e., expressed preferences by the user about selected media and preferences for certain media outlets, such as broadcast stations or channels and publishers, as specifically expressed or determined from user behavior. The user's consumption history can also be determined by reviewing the user's media collection, such as audio and visual assets, public library check-out history, or history of video recording activity. Any or all of these attributes can be combined to determine the search parameters and tailor the search results to the user's personal taste.

The search engine 112 then queries one or more databases to find media instances of interest to the user (step 216). The media instances can be found using the determined parameters. The databases can each contain information about different sources of media. One database can include information about television programming, movies, musical recordings, or a combination thereof. In the instance of television programming, such as programming that is available to the user by terrestrial broadcast, cable, satellite, pay-per-view, subscription (e.g., premium cable and satellite material), broadband delivery, video on demand, or otherwise, information is available from various commercial sources, including sources such as Tribune Media and TitanTV. In one implementation, the search engine 112 searches more than one database, where one of the databases has information related to television programming and another database has information about movies available in the theater or recorded on physical media. In another implementation, one of the databases that is searched includes information about broadcast television and another of the databases includes information about downloadable or on-demand media services. Databases can provide information not only about television programming, movies or recordings that are scheduled to occur in the future, but also programming, movies or recordings that were aired in the past. Other databases can include information about live performances, museum exhibits or other events in the community.

Other databases accessible by the media search system 100 can contain information about movies that are planned for release, theatrical or otherwise. This information is typically available from major movie studios and from public information clearinghouses, such as the Internet Movie Database (IMDB). Information about movies that are currently available, such as movies in theaters, on television, available for purchase or rent, is available from a combination of several sources. The sources can include Tribune Media for theater locations and show time information and television program schedules for movies on television, IMDB for recorded movies available for purchase or rent, and digital distributors such as CinemaNow for movies available for digital delivery.

In yet other databases, information associated with musical recordings that are planned for release by digital delivery, on a recording medium, or otherwise is available from a combination of several sources, including music label press releases. Information about musical recordings currently available, such as by broadcast medium, point-to-point digital delivery and by a physical recording medium is available from one or a combination of several sources, including Amazon.com, Inc., and Apple Computer, Inc.

Information about musical recordings, movies or other media that the user already owns or for which the user has an available license can be obtained from data provided by the user or an analysis of the user's electronic recordings.

The search engine 112 can also acquire information about planned live performances of music and theater and displays of works of art, such as at a museum or gallery. This information is available from a combination of several sources, including ticket brokers and agents, such as Ticketmaster and Telecharge.com (The Shubert Organization, Inc.).

After querying multiple databases for media instances of interest to the user, the search engine 112 retrieves data pertaining to the media instances meeting the search parameters (step 221). The data can be sorted according to user preferences, if any are available. Alternatively, the media instances can be categorized, such as by cost, media form or source. The search engine 112 can send the retrieved data to the memory 140 for temporary or permanent storage. The search engine 112 then communicates the retrieved data to the graphics module 129.

The graphics module 129 sends a representation of the retrieved data to a display (step 233). The representation of the results can include information about the media instance, including the title, the subject matter, the form, where the instance can be accessed, the time and date that the instance is available, persons associated with the instance, such as the author, artist or actor, ratings, the source of the instance, any cost associated with accessing the instance and delay intrinsic to acquisition of the instance, as well as other information. A preview, such as compiled excerpts of the media instance (e.g., a television advertisement or movie trailer), or descriptive material, and interviews, in text, pictorial (e.g., video frame), audio, or video form can also be presented to the user. In the case of pictorial material, the preview can be a truncated version of the full work, such as an excerpted version at full or lower resolution or a version marked with watermarks or visual indications that the image is a preview.

When the information is presented to the user, the graphics module 129 can use colors, textures and symbols to inform the user about different attributes of each of the media instances. For example, one color can indicate whether a media instance is available at no charge, while another color can indicate that a media instance is only available on a subscription basis or for a fee. The colors, textures or symbols can also be used to indicate that a media instance is available in one or more particular forms or that the media instance is of particular interest to the user or has earned a particular rating.

Once the user can view the description of the retrieved media instances, the user can select one or more of the items. The data communicator 107 receives the selection from the user (step 238). The media acquisition engine 171 determines whether a selected item is available (step 242). If the item is not available to the media acquisition engine 171, the user can be informed that the item is not available (step 245). If the item can be accessed by the media acquisition engine 171, such as by recording, ordering, renting, licensing or purchasing the right to obtain or access the media instance, the media acquisition engine 171 determines whether the item is currently available or available in the future (step 249).

If the item is currently available, the media acquisition engine 171 can obtain a copy of the media instance (step 251). The media search system 100 can either automatically perform the acquisition or request input from the user indicating approval of the acquisition. If payment is required for accessing the media instance, the media acquisition engine 171 can access necessary information from the memory 140, such as a debit account number, a credit card number, a physical address, a phone number or other means for charging the user. Alternatively, the media search system 100 can include an external payment reader capable of accepting one or more methods of payment. The media instance is then delivered to the user (step 255). Delivery methods can include broadcast over the airwaves, delivery over a telephone line, Internet, cable, broadband, or delivery by a government or privately owned mailing company or other suitable delivery mechanisms.

If the media instance is not currently available, information regarding future availability of the media instance can be provided to the user (step 260). The user can then select whether to have the media instance obtained automatically when the item becomes available, be notified when the item become available or both (step 264). The information about the item, including the date of availability and whether the user wants the item delivered or only to receive a notification of availability, can be stored in the memory 140. If the user requests that the instance be obtained when the instance is available, the media acquisition engine 171 can obtain the instance at that time (step 275). If the user requests notification, the notification engine 152 can send a notice to the user when the item is available (step 280). The notice can be one of a text message, such as an e-mail, an instant message, a short mail message or a pager message, a voice mail or another method of communicating a notice to the user.

In one implementation, the user's search request can be saved in the memory 140. Searches can be saved automatically, or in response to a command from the user. Optionally, searches can be rerun at a later time. The search can be rerun, such as at a scheduled time, including at predetermined intervals, at the request of the user, or when the media search system 100 receives notice from one of the sources that new instances are available. Saved searches can operate against new or updated data sources. If new results meeting the user's criteria or the search parameters are retrieved, the media search system 100 can notify the user by one of the methods described above. Alternatively, the media search system 100 can automatically acquire media instances upon finding a media instance that meets the user's criteria. In some cases, instances that are not currently available, but that likely will become available in the future, can be determined by the media search system 100. The media search system 100 can search to find programs that are currently or were previously available by searching the media databases. The media search system 100 can then determine media that is typically made available in the future and that is related to programs that were available in the past. For example, a mini-series television program that aired in the past can become available in the future on DVD.

Stored search results in memory so that the media search system 100 can send a notice to the user when the media instance becomes available can also be used to notify the user when the media instance becomes available in a form that the user is interested in. The same item can become available in multiple forms and the user may only be interested in one or more of the particular media forms. If a movie is currently in the theaters, the user may want to wait to purchase a DVD of the movie and set the notification for the release date of the DVD.

In one implementation, the notification can also, or alternatively, be sent to another party, such as in transferring a purchase request from a child to a parent. The notification can also be sent to a source of the media instance, requesting that the media instance be made available to the user. One specific example includes automatically sending by media search system 100 a request to a library reservation system a hold for a desired book when the library acquires the book.

The media search system 100 can also respond to queries and create and deliver lists dynamically to the user's, or another's, Personal Digital Assistant or mobile computing or communication device. The notification step can be used to provide the user with information when the user is away from the media search system 100. The user can request a notification remotely when the user is in close proximity to the media search system 100. As an example of an instance in which the user can call up the media search system 100, the user can request that the media search system 100 send the user a list of the user's highest priority movies that are currently playing in theatres and the show times. As another example, a user can request that a ranked list of the movies that the user would like to see and that are currently available on DVD in the video store be sent to her spouse who is at the video store selecting a DVD.

Regarding step 251 (the acquisition step of FIG. 2), acquisition options vary depending on the media instance. Acquisition, by either the media search system 100 or the user, can include recording a copy of the instance when such item is broadcast over an available channel, such as, broadcast television, radio, or Internet streaming; purchasing the physical original or a physical recording or copy where the physical item is subsequently delivered to the user or picked up at a local retail outlet; renting a physical recording or copy;

reserving a physical recording or copy at a local public library; licensing an electronically delivered copy; attending a public presentation of the instance, e.g., a concert featuring the song or artist, theatrical presentation of a work, or a gallery showing.

In each case, the details of the acquisition option can include the price and approximate delivery time, but can also include a variety of additional information. A user can have a preferred acquisition method that the user takes into account when the user selects a particular media instance, such as receiving media instances from a specified delivery channel or obtaining only media instances that fall below a predetermined price point. The ability to complete an acquisition can also depend upon the resources, both physical and data, available to the media search system 100. Required physical resources can include resources with the ability to record broadcast material, or the ability to accept and store an electronically delivered instance and implement a restricted use license. The media search system 100 can be in communication with other devices that are capable of acquiring media instances that the media search system 100 is unable to acquire. Required data can include specific user information, such as, data needed to pay for the accessed media instance or deliver the accessed media instance to the user, including credit card numbers, physical address and phone number. In addition, the data can include information about preferred suppliers and a list of unacceptable suppliers of media instances and specific information about an account at a particular supplier. The media search system 100 can also include data that prevents particular types of media instances from being obtained, such as by limiting a child's access to instances with adult themes.

The user can flag instances as being of interest to the user even when the instances are not acquired. Once the user has marked specific media instances as being of interest, a media list can be maintained that includes the media of interest. The media search system 100 can provide the user with information in a form that is useful for the user. This information can be time consuming for the user to compile and sort. List management capabilities can be implemented, including, without limitation, modifying the list data (priority, notifications, etc.), selecting a portion of the list, exporting a selected portion of the list data (e.g., in delimited text or XML form), importing list data, comparing two portions of list data, including list data from other users or imported list data, and sorting the media list by various criteria. Sorting can be by relative priority, date of addition to the list, date of last change of list data for an instance, type of notification, type of requested form, whether or not notification criteria have been met, whether or not acquisition criteria have been met, or any ordered combination of the available criteria, e.g., "notification criteria have been met, type of form, relative priority".

In one implementation, the license module 193 in addition to obtaining a necessary license for accessing a media instance upgrades an existing license. A license typically includes terms and conditions, such as limitations on duration of availability, number of uses, number or type of copies, etc. One example of such a license upgrade includes a user extending the time limit on a license, such as from 36 hours to 7 days. Another example is when a user only has a license to a media instance at a limited sampling rate or quality. A license can be obtained that allows the user to acquire a superior rendition of the same media instance.

Automatic Media Searching: Tracking Media

In one implementation, the user input is in response to an advertisement for a media instance. A user can identify a desired media instance after viewing or experiencing the advertisement. The tracking engine 175 can perform one or more of the following actions for each media instance that the user has indicated an interest. The media instance can be marked as "of interest" and assigned a relative priority (e.g., a numerical priority ranging from 1 to 5). The user can then be notified when the media instance becomes available. The instance can become available in many forms and under many conditions, such as at no charge (e.g., if the item becomes available at the local library, or if the item is scheduled to be broadcast), at a particular time, on a specific date or after a specific period of time has elapsed (including immediately), at a particular price (e.g., at a price below a specific threshold, or at a new price which is a certain percentage less than the current price), when the media instance becomes available in a certain form (e.g., a movie is released on DVD, or an album becomes available electronically) or when the media instance becomes available from a preferred supplier (e.g., Amazon now sells the desired book). The user can select the criteria, including the form and conditions under which the user wishes to be notified.

In one implementation, the user can request more information or related media instances to a media instance that the user is watching, listening to or otherwise experiencing. The input can be a single input, such as button on remote control 109. By selecting more information or related media, the media search system 100 can determine the media instance that the user is currently experiencing. The media search system 100 then determines what other media instances are related to that instance. The media search system 100 can then present descriptions of the other media instances to the user.

Automatic Media Searching: Correlation

Figure 3:
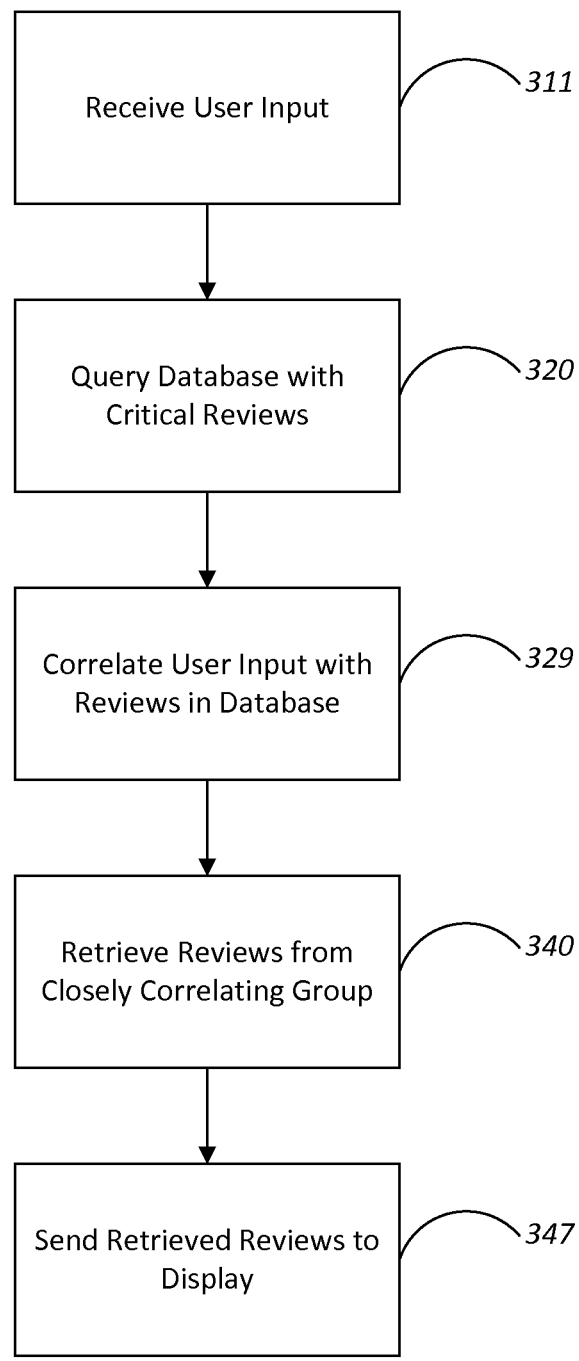
FIG. 3 is a flow diagram of a critical correlation method.

As shown in FIG. 3, the user can also select media of interest based on critical reviews, or a critical correlation method. The user inputs into the media search system 100 media instances that have been consumed by the user, such as movies the user has viewed, books the user has read, or gallery shows the user has attended (step 311). These instances of consumed media can also be automatically tracked by the media search system 100 such that the user input creates a historical record of the user's acquisition and consumption of media. Alternatively, or in addition, the user can input ratings of media instances that the user has consumed. The search engine 112 then queries a database (e.g., database 121) having critical reviews of media instances (step 320). Each of the critical reviews is stored in groups, such as by reviewer. Reviewers can be professional reviewers, amateur reviewers, or others using similar search systems and storing their reviews in a database accessible to the search engine 112.

The search engine 112 correlates the reviews input by the user to a group of reviews and selects at least one group of reviews that correlates the most closely with the user's reviews (step 329). The search engine 112 retrieves one or more reviews from the correlating group (step 340). The search engine 112 can retrieve the one or more reviews based on criteria input by the user, such as a form of media instance or another description of the media instance. The search engine 112 then sends the retrieved reviews to the graphics module 129 to display a representation of the retrieved reviews to the user (step 347).

The critical correlation method allows the identification of a critical voice with similar tastes to the user. The critic is likely to provide critical feedback about other media of interest to the user if the critic's previous feedback correlates highly to the user's history of acquisition and ratings. The critical correlation method can be superior to an inter-user correlation method, described further below, because consumption and acquisition activities do not imply subsequent approval of the media and can therefore lead to inappropriate correlations.

Media Search Results Sharing

In one implementation, the data created by the search criteria and the user's history or media assets can be accessed by others. The data may be public, private or accessible by a defined group of users, such as a subscription based group or a user defined group. When the data of one user is accessed by others, an inter-user correlation method can be implemented. In the inter-user correlation method, information about a particular user, such as the user's previous media consumption, ratings and interests, is correlated with other users about whom similar information is available. The other users' information can be collected from other users of the media search system 100, or from a database of user preferences either related to the media search system 100 or accessible by the media search system 100. Media that are demonstrably of interest, according to consumption, acquisition, ratings or otherwise, to other users who have a high degree of correlation to the user are presumed to be of interest to the user as well.

Access to other's media data can allow the media search system 100 to compare data and determine overlap of desired media instances. In addition to finding new media instances for the user to obtain, determining overlap of desired media instances can be helpful, for example, in finding media instances of interest to multiple users who wish to experience media together, such as attend a concert or watch a television program. For example, the media search system 100 can compare movies a user wants to see with the media lists of three other users and find the highest priority movie that all four want to see.

Because the media search media search system 100 can search databases, one of the databases can include media owned by the user. The database can include the user's assets, such as user created movies, photos, slide shows, music and other such media instances. In one implementation, the media search system 100 can search for media instances that the user owns and that match a user input criteria. The user can then request that the media instances be delivered from storage to another party or apparatus. The media instances can then be displayed, such as on a television, printed, distributed, such as to others or to a web site, converted into another product, such as a greeting card, a t-shirt, a calendar, a mug, or other household products, or converted into a different form, such as transferring a video recording from a disk drive to a DVD.

The following examples provide just a few scenarios in which the media search system 100 can be used.

EXAMPLES

Example 1

If a system performs a search for all movies starring Tom Hanks, the search results may include:
  several DVD's owned by the user (available to watch at any time at no charge)
  a movie available on Pay-per-view the following evening, with a cost of $4.95
  a movie already recorded on a local hard disk
  a movie scheduled for broadcast on TNT later tonight
  a movie scheduled to broadcast on HBO the following week
  the same movie available on DVD in stock at a local video rental store for $3.95
  the same movie available for download on a 36 hour license for $3.95
  a movie currently in production, but due in theaters in 7 weeks
  a movie playing at a local theater starting in 20 minutes for $7.00

Example 2

Find New TV Shows

A user is tired of watching the same television shows and it's summer and she's seen everything anyhow. She composes a search for episodic television shows that meet the following criteria:
  she has never watched or recorded them (i.e., they are new to her)
  they have received favorable reviews (e.g., they have received a rating above half on the applicable rating scale)
  an episode is scheduled to be broadcast on her cable system in the next 2 weeks
  no half-hour comedies When the search is completed, five shows have been identified. Four of them just have the text description available, but there is a trailer available for the fifth. After previewing that show and reading information about the others, she selects two shows that sound interesting and specifies that future episodes be recorded for her.

Example 3

Find Other Work by an Actor

A user is watching his favorite television show and is fascinated by a guest star. He pauses the show and conducts a search for other work that the actor has done. The search results include four credited movies, two guest appearances on other television shows, and a currently running Broadway musical. Three of the movies are available on DVD, so the user adds them to his NetFlix request list. The fourth is currently available on Pay-per-View, but he elects not to purchase but instead be notified when the movie is available on DVD. One of the television guest appearances is scheduled to be broadcast on A&E in 10 days, so he requests that the show be recorded when the show appears. Lastly he sends notification of the Broadway musical to his wife to see if she is interested in purchasing tickets.

Example 4

Find Other Works by an Artist

While listening to one of her favorite songs, the user wonders if the artist has released any new songs lately. She conducts a search of all electronically available tracks from the artist. The search results show that the user already has copies of all available works by the artist, but that several recordings are inferior to what is now available. After previewing the updates, the user elects to immediately purchase upgrades to those recordings for electronic delivery. She also saves the search so that she will be notified immediately if additional songs become available.

Example 5

Find Recommended Music

A user is tired of the same old music and wants to find new music that he'll like. He conducts a search for music recommended by critics who recommend the music that's already in his "Favorite Albums" play list. The critical correlation method identifies two professional and five amateur music reviewers whose recommendations are correlated with the user's preferences. By analyzing and comparing the recommendations of the seven, and seeking correlations among their recommendations that are not currently part of the user's music collection, the search results present a "top ten" list of recommended songs and albums. Most of these selections provide a preview/excerpt capability, and after listening to the selections, the user purchases three new tracks and one new album.

Example 6

Automatically Finding Media Related to Media Presently Being Experienced

A user is watching a movie and is enthralled by the soundtrack. The user selects the More Information button on her remote control while the movie is playing. The media search system 100 determines the movie that the user is watching by determining that the user is watching a movie on a particular satellite channel and presents the user with options regarding the type of information that the user is interested in. The user selects composer from a list including actors, director, writers, composers and musicians associated with the film. The media search system 100 presents the user with an option to access the soundtrack of the movie, other movies including the composer's works, as well as other soundtracks available by the same composer. The user schedules her personal video recorder to record one of the movies on a pay per view station the following night.

The functional operations described in this specification can be implemented in digital electronic circuitry, or in computer hardware, firmware, software, or in combinations of them. The data communicator 107, search engine 112, graphics module 129, memory 140, notification system 152, media acquisition engine 171, tracking engine 175, preview provider 189, recording device 190 and licensing module 193 can all be in a single device that is in communication with a television. The device can include additional processors or computing devices. Each of the components can be combined with other components to form single components that perform multiple functions. One or more of the components can be included in a television. The device can be in communication with a computer in addition to or instead of a television.

Method steps of the invention can be performed by one or more programmable processors executing a computer program to perform functions described above by operating on input data and generating output. Method steps can also be performed by, and apparatus of the invention can be implemented as, special purpose logic circuitry, e.g., an FPGA (field programmable gate array) or an ASIC (application-specific integrated circuit).

To provide for interaction with a user, the invention can be implemented on a television, a computer having a display device, e.g., a CRT (cathode ray tube) or LCD (liquid crystal display) monitor, for displaying information to the user and a keyboard and a pointing device, e.g., a mouse, a trackball or a remote, by which the user can provide input to the media search system 100. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

A number of embodiments of the invention have been described. Nevertheless, it will be understood that various modifications may be made without departing from the spirit and scope of the invention. For example, the media search system can be used in conjunction with a computer system instead of a television. In one implementation, not all of the components described with respect to media search system 100 are required. In one implementation, the media search system 100 is included in a set-top box for a television, a personal video recorder or digital video recorder or a DVD-player. Accordingly, other embodiments are within the scope of the following claims.

What is claimed is:

1. A method for searching for media of interest to a user, comprising:
   using a computer to perform a sequence comprising the steps of:
   retrieving a plurality of lists of media instances that are of interest to a plurality of users in a group;
   determining from the lists media instances that are of interest to all members of the group;
   displaying information about the media instances that are of interest to all the members of the group;
   finding groups of reviews of media instances where each media instance is assigned a review, wherein the media instances are grouped according to a reviewer who assigned the review to the media instance;
   selecting a group of reviews according to the reviews in the group and information known about the user's media interests; and
   selecting a media instance from the selected group that is potentially of interest to the user, wherein the selected media instance is assigned a favorable review by the reviewer.

2. The method of claim 1, further comprising providing a preview of one or more of the selected media instance.

3. The method of claim 1, further comprising providing information to the user for acquiring the selected media instance.

4. The method of claim 3, wherein providing information to the user for acquiring the selected media instance includes providing a schedule for a broadcast of entertainment content.

5. The method of claim 4, wherein providing information to the user for acquiring the selected media instance includes presenting the user with an option to purchase, license or place an order for the media instance.

6. The method of claim 1 including:
   receiving an indication from the user during presentation of a media instance that the user is interested in;
   searching for the related media instances and retrieving information about related media instances; and
   presenting to the user a representation of the information about the related media instances.

7. The method of claim 6, wherein receiving the indication from the user occurs during presentation of a media instance that is broadcast.

8. The method of claim 1, wherein:
   retrieving the plurality of lists includes retrieving a plurality of lists that include media instances that have a ranking assigned to each media instance; and
   displaying the information about the media instances that are of interest to all members of the group includes displaying the media instances in a ranked order.

9. The method of claim 1, further comprising sending the information about the media instances to a personal communications device.

10. A non-transitory computer readable storage media storing instructions executed by a computer to perform a sequence to search for media of interest to a user, said sequence comprising:

retrieving a plurality of lists of media instances that are of interest to a plurality of users in a group;

determining from the lists media instances that are of interest to all members of the group;

displaying information about the media instances that are of interest to all the members of the group;

finding groups of reviews of media instances where each media instance is assigned a review, wherein the media instances are grouped according to a reviewer who assigned the review to the media instance;

selecting a group of reviews according to the reviews in the group and information known about the user's media interests; and selecting a media instance from the selecting group that is potentially of interest to the user, wherein the selected media instance is assigned a favorable review by the reviewer.

11. The media of claim 10, said sequence further comprising providing a preview of one or more of the selected media instance.

12. The media of claim 10, said sequence further comprising providing information to the user for acquiring the selected media instance.

13. The media of claim 12, wherein providing information to the user for acquiring the selected media instance includes providing a schedule for a broadcast of entertainment content.

14. The media of claim 13, wherein providing information to the user for acquiring the selected media instance includes presenting the user with an option to purchase, license or place an order for the media instance.

15. The media of claim 10, said sequence including:

receiving an indication from the user during presentation of a media instance that the user is interested in;

searching for the related media instances and retrieving information about related media instances; and presenting to the user a representation of the information about the related media instances.

16. The media of claim 15, wherein receiving the indication from the user occurs during presentation of a media instance that is broadcast.

17. The media of claim 10, wherein:

retrieving the plurality of lists includes retrieving a plurality of lists that include media instances that have a ranking assigned to each media instance; and displaying the information about the media instances that are of interest to all members of the group includes displaying the media instances in a ranked order.

18. The media of claim 10, said sequence further comprising sending the information about the media instances to a personal communication device.

* * * * *